(12) United States Patent
Veglio

(10) Patent No.: US 10,412,973 B2
(45) Date of Patent: Sep. 17, 2019

(54) INJECTION MOLDING SYSTEM FOR A FAT-CONTAINING PRODUCT

(71) Applicant: LIVE-TECH S.R.L., Alba (IT)

(72) Inventor: Domenico Veglio, Alba (IT)

(73) Assignee: LIVE-TECH S.R.L. (IT)

( * ) Notice: Subject to any disclaimer, the term of this patent is extended or adjusted under 35 U.S.C. 154(b) by 262 days.

(21) Appl. No.: 15/319,977

(22) PCT Filed: Jun. 18, 2015

(86) PCT No.: PCT/IT2015/000157
§ 371 (c)(1),
(2) Date: Dec. 19, 2016

(87) PCT Pub. No.: WO2015/193927
PCT Pub. Date: Dec. 23, 2015

(65) Prior Publication Data
US 2017/0135365 A1    May 18, 2017

(30) Foreign Application Priority Data

Jun. 20, 2014  (IT) .............................. TO2014A0491

(51) Int. Cl.
*A23G 1/20*    (2006.01)
*A23G 1/21*    (2006.01)
(Continued)

(52) U.S. Cl.
CPC .............. *A23G 1/205* (2013.01); *A23G 1/21* (2013.01); *A23G 1/22* (2013.01);
(Continued)

(58) Field of Classification Search
CPC .... B29C 2045/2766; B29C 2045/2767; B29C 2045/2753; B29C 2033/023
See application file for complete search history.

(56) References Cited

U.S. PATENT DOCUMENTS 4,622,001 A * 11/1986 Bright ................. B29C 45/7312
425/549
5,002,480 A * 3/1991 Gellert ................ B29C 45/2806
137/340
(Continued)

FOREIGN PATENT DOCUMENTS

DE      11 80 613 B     10/1964
EP      0 017 104 A2    10/1980
(Continued)

OTHER PUBLICATIONS

Advantage Engineering, "Turbulent and Laminar Flow", Jun. 30, 2013 (Year: 2013).*
(Continued)

*Primary Examiner* — Alison L Hindenlang
*Assistant Examiner* — George W. Brady
(74) *Attorney, Agent, or Firm* — Brinks Gilson & Lione; Ryan L. Marshall; Andrew Umlauf

(57) ABSTRACT

An injection molding system (1) is described, for at least one fat-containing product in at least one die (9), equipped with at least one injection means (3), the injection means (3) being equipped therein with at least one injection channel (2), the system (1) comprising at least one heating element (5) arranged inside the injection means (3) in parallel with the injection channel (2) and at least one male half-shell (8) of the die (9), connected to at least one lower surface of at least one cooled support means (7).

12 Claims, 2 Drawing Sheets

Figure 1:
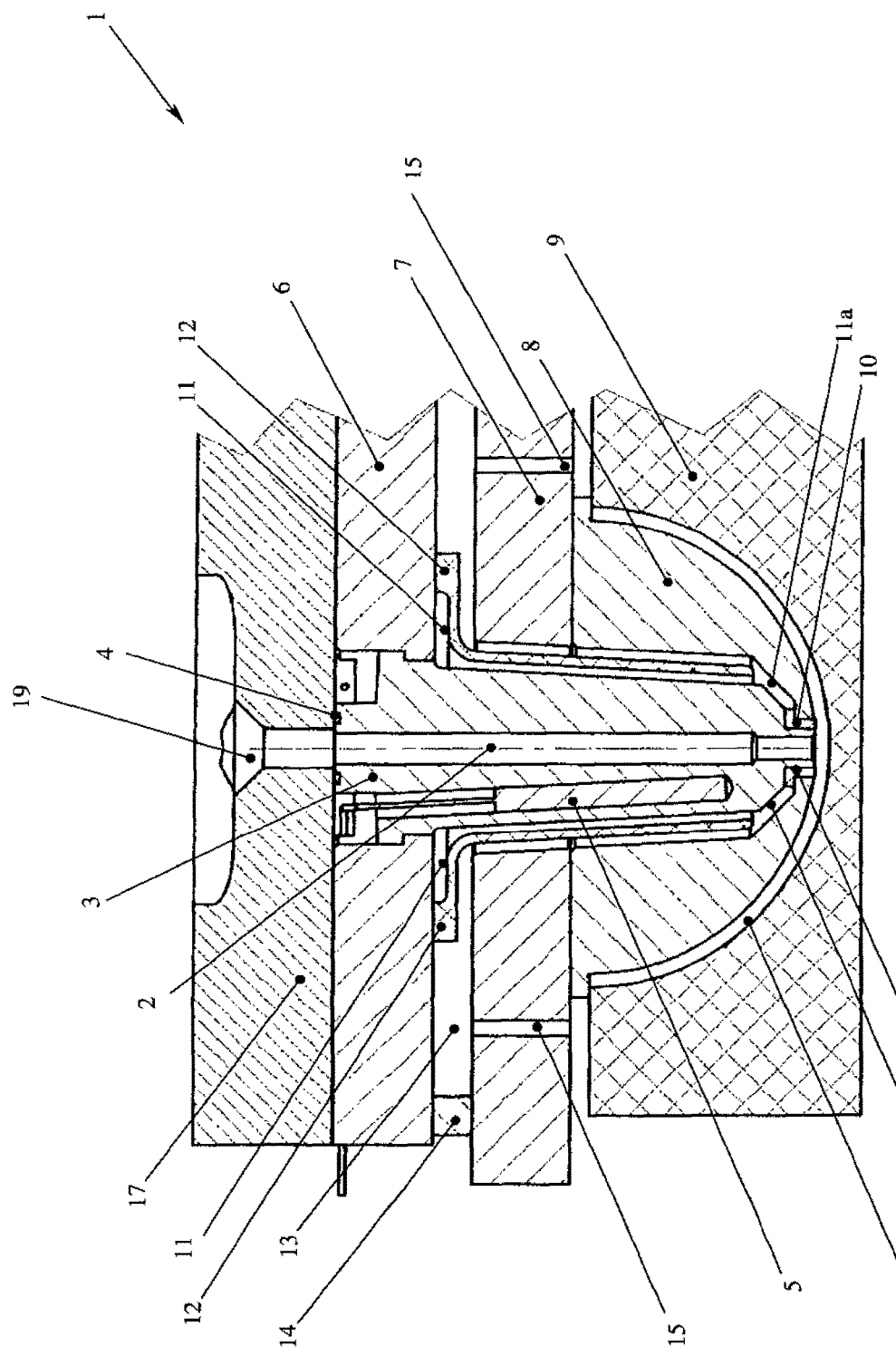

(51) Int. Cl.
*A23G 1/22* (2006.01)
*B29C 45/27* (2006.01)
*B29C 33/02* (2006.01)

(52) U.S. Cl.
CPC ............................ *B29C 2033/023* (2013.01); *B29C 2045/2753* (2013.01); *B29C 2045/2766* (2013.01); *B29C 2045/2767* (2013.01)

(56) References Cited

U.S. PATENT DOCUMENTS

| | | | | |
|---|---|---|---|---|
| 5,118,280 A | * | 6/1992 | Gellert | B29C 45/2737 264/328.15 |
| 5,454,426 A | * | 10/1995 | Moseley | F02B 33/00 123/41.67 |
| 5,879,727 A | * | 3/1999 | Puri | B29C 45/27 264/328.15 |
| 5,980,236 A | * | 11/1999 | Gellert | B29C 45/27 264/328.8 |
| 7,168,942 B1 | * | 1/2007 | Wieder | B29C 45/7306 249/79 |
| 2005/0226956 A1 | * | 10/2005 | Fischer | B29C 45/27 425/549 |
| 2008/0279979 A1 | * | 11/2008 | Fairy | B29C 45/2806 425/565 |
| 2011/0233821 A1 | * | 9/2011 | Bandoh | B29C 43/18 264/272.11 |
| 2011/0311676 A1 | * | 12/2011 | Fairy | B29C 45/2725 425/548 |
| 2012/0187610 A1 | * | 7/2012 | Chen | B29C 45/27 264/535 |
| 2013/0243899 A1 | * | 9/2013 | Babin | B29C 45/22 425/549 |
| 2016/0151948 A1 | * | 6/2016 | Jenko | B29C 45/2725 425/549 |

FOREIGN PATENT DOCUMENTS

| | | | |
|---|---|---|---|
| EP | 0017104 A2 | * 10/1980 | ............. A23G 1/205 |
| EP | 1 413 205 A1 | 4/2004 | |
| EP | 1 676 485 A1 | 7/2006 | |
| GB | 1 183 777 A | 3/1970 | |
| WO | WO 1994/012046 A1 | 6/1994 | |
| WO | WO 2008/092310 A1 | 4/2004 | |

OTHER PUBLICATIONS

International Search Report for PCT/IT2015/000157, filed Jun. 18, 2015.

* cited by examiner

INJECTION MOLDING SYSTEM FOR A FAT-CONTAINING PRODUCT

REFERENCE TO EARLIER FILED APPLICATIONS

This application is a 371 national phase of International Application No. PCT/IT2015/000157, filed Jun. 18, 2015, and claims priority to Italian Application No. TO2014A000491, filed Jun. 20, 2014, the disclosures of which are incorporated, in their entirety, by this reference.

The present invention refers to an injection molding system for a fat-containing product in a die, adapted to provide shaped solids.

In particular, the system of the present invention can be applied to the production of products having a relatively thin thickness, commonly shaped as a shell, by replicating the surface finish and the shape of the die and of the half-shell and possibly suitable to be filled with an edible composition.

An injection molding system is known in the art, which is equipped with a die composed of two half-shells shaped as a shell, which mutually define a molding recess; the molding recess is equipped on its top with an opening hole, suitable for the pressurized injection of chocolate inside the die. Afterwards, the die is removed from the system and conveyed through a cooling chamber. Upon exiting the cooling chamber, the die is opened or emptied, allowing the removal of solidified chocolate.

The described system has a plurality of disadvantages, due above all to the great use of time necessary for completely filling the die: moreover, the removal of the solidified product occurs after the die has been driven inside the cooling chamber, so that it is necessary to wait for the cooling times of the single die before being able to proceed with a new molding process, or possibly it is necessary to provide the system with further, relatively costly dies, in order to reduce the cooling waiting times for the first and single die. Moreover, the system does not guarantee a good molding yield if compared with other known systems, since the system operates with very low injection pressure values which impair its yield.

An apparatus for producing chocolate solids is also known, equipped with a multiple die and an injection tool. Melted chocolate is injected under pressure, through the injection tool, in a recess composed of two half-shells and equipped with a suitable injection hole; moreover, the apparatus is equipped with cooling channels inside which a cooling liquid circulates, and with two injection channels externally coated with an insulating layer and equipped with nozzles on the bottom. The nozzles are equipped with a heating cartridge placed in a stem valve and are also coated with an insulating layer, such as, for example, the one disclosed in EP0017104.

It is clear how the disclosed apparatus is complex to produce and is highly encumbrant, above all due to the sizes of the cooling channels with which it is equipped. Moreover, the presence of the cooling channels allows reducing the necessary time for cooling and consequently removing the chocolate solid from the die, but it is not able to guarantee a uniform cooling of the whole recess of the die, and an accurate regulation of the chocolate weight inside the formed solid, possibly impairing its yield.

A molding system is also known, as disclosed for example in WO9412046, mainly composed of three components: the first containing the injection channel, the second and the third given by the two half-shells of the die. The components has the shapes and sizes as to allow their mutual connection, and enable the injection of melted chocolate inside the recess delimited by the two half-shells. In particular, the three components are composed of different materials depending on the necessary heat conductivity to enable a heat transfer, under differential mode, during the passage of melted chocolate from the injection point to the molding recess, along the injection channel.

Finally, injection molding systems are known which are equipped with an internal hot channel and/or secondary channels suitable to enable a transfer of the melted product in short times and with low pressure losses. The functional features of the types of systems strongly depend on the design of the hot channels, in particular on their structural features such as sizes, diameters, etc., which strongly affect the final features of the molded solid.

It is clear from an analysis of the prior art that existing injection molding systems do not allow a functional cooling and an optimum detachment of the product solidified by the die. Moreover, the systems do not allow a check of the product temperature during the passage of the melted material, along the injection channel, from the injection point to the entry point in the die recess.

Therefore, an object of the present invention is solving the above prior art problems, by providing an injection molding system capable of optimizing the production of shaped solids of a fat-containing product.

A further object of the present invention is providing an injection molding system capable of verifying the temperature of the fat-containing product during its flow inside the injection molding system.

Moreover, an object of the present invention is providing an injection molding system adapted to adjust the cooling step of the product guaranteeing a uniform cooling.

The above and other objects and advantages of the invention, as will result from the following description, are obtained with an injection molding system of a fat-containing product as claimed in claim 1. Preferred embodiment and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention, as will appear from the enclosed claims.

Figure 2:
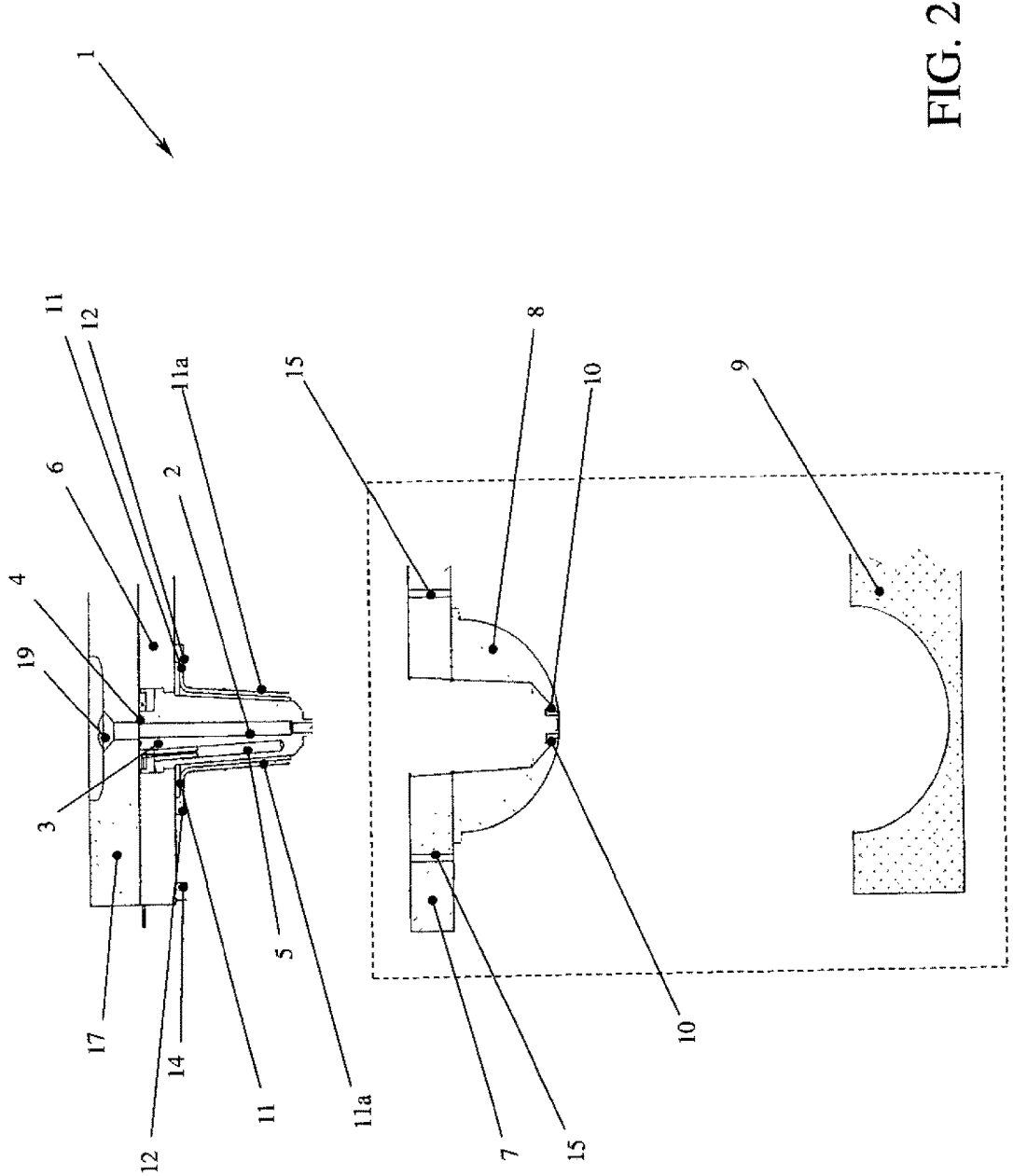

The present invention will be better described by some preferred embodiments thereof, provided as a non-limiting example, with reference to the enclosed drawings, in which:

FIG. 1 shows a sectional view of a preferred embodiment of the injection molding system according to the present invention; and FIG. 2 shows a sectional view of the main components of the injection molding system according to the present invention.

With reference to FIG. 1, it is possible to note that the injection molding system 1, in a die 9, of a fat-containing product, such as for example melted chocolate with or without solid inclusions or other similar one, is equipped with at least one injection means 3, such as for example a duct with variable area, or a nozzle or other suitable one, advantageously converging and with a frustum-of-cone section; the fat-containing product slides at its melted state, from the bigger to the smaller diameter, inside the injection means 3 in at least one injection channel 2 with internal calibrated hole.

The above mentioned system 1 substantially comprises:

at least one heating element 5 arranged in a cylindrical chamber inside the injection means 3 in parallel with said injection channel 2, the heating element 5, such as, for example, a resistance with armored spark plug, or a high-efficiency resistance of the Masterflow type, or a band-type resistance, advantageously assumes a cylindrical shape and guarantees a homogeneous distribution of heat: it is wholly evident that the heating element 5 can be composed of any other means adapted to reach the above objects. Moreover, the heating element 5 is possibly equipped with at least one thermal regulating element, placed in the distal part of the heating element 5, allowing an accurate detection and regulation of the product temperature;

at least one male half-shell 8 of the die 9, such as for example a suitably shaped punch or other similar one, connected to at least one cooled support means 7, for example through bolt-type junctions or chemical fastening, the half-shell 8 being equipped with at least one internal room, adapted to enable at least one coupling of the injection means 3 with the half-shell 8.

The half-shell 8 is further equipped with at least one thermal insulating means 10, such as for example a diathermal bush made of insulating material. The thermal insulating means 10 is fastened to at least one internal surface of the internal room of the half-shell 8, and is connected with at least one lower end of the injection channel 2 of the injection means 3, in order to prevent the lower end of the injection means 3 from heating the half-shell 8.

In particular, the half-shell 8 is adapted to cooperate with at least one female half-shell, delimiting at least one volume 16, the volume 16 being adapted to house and contain the fat-containing product injected by the injection means 3, and to impress the desired shape to the product.

The injection means 3 is fastened to at least one conveying means 17 of the fat-containing product through at least one heated junction means 6 such as, for example, a plane flange, a step, a metallic gasket, a simple or double chamber, allowing a linear coupling between at least one conductive element 19, with which the conveying means 17 are equipped, and at least one upper end of the injection channel 2 of the injection means 3; moreover, the injection means 3 are possibly equipped with at least one first sealing element 4, such as, for example, a static sealing gasket, a toric or square section, made of silicone, or another material, guaranteeing that the fat-containing product does not leak next to the coupling between the conductive element 19 and the upper end of the injection channel 2.

Moreover, the injection means 3 are coupled with the half-shell 8 by fastening the lower end of the injection channel 2, of the injection means 3, in the bush of the half-shell 8, the coupling between the injection means 3 and the half-shell 8 delimiting a volume 11*a* adapted to insert the adjusting means 12 of the gas insulating system, into the internal room of the half-shell 8.

The cooled support means 7, such as for example a flange or a plate, or other suitable one, are equipped with at least one central hole adapted to enable the insertion of the injection means 3 into the internal room of the half-shell 8, and the insertion of the adjusting means 12 inside the volume 11*a*; moreover, the cooled support means 7 are equipped with at least two through-holes 15, suitably arranged also in parallel with the injection means 3.

Moreover, the system 1 according to the present invention can comprise at least one gas insulating system, comprising at least one means for entering 11 at least one insulating gas (preferably dry air), such as for example an entry mouth or other similar one, and at least one adjusting means 12, such as for example a baffle or other similar one, the adjusting means 12 being connected to a surface of the heated junction means 6 through mechanical, chemical or other suitable fastening.

The gas insulating system is adapted to enable the entry of at least one insulating gas, such as for example dry air, through the means for entering 11, between the injection means 3 and the half-shell 8, possibly also inside the volume 11*a*, inducing the thermal insulation between the half-shell 8, cooled by the cooled support means 7, and the injection means 3, heated by the heating element 5, and afterwards to convey, through the adjusting means 12, the insulating gas in the transit area 13. Afterwards, the insulating gas, through the adjusting means 12, outflows from the area 13 towards the die 9, through one or more through-holes 15, of the cooled support means 7.

Moreover, the gas insulating system allows regulating and controlling the dew point of the half-shell 8 and of the die 9, till the shaped solid is obtained.

In addition, the cooled support means 7 and the heated junction means 6 delimit a transit area 13, being mutually connected through at least one second sealing element 14, such as for example a gasket, a toric or square section, made of silicone, or other material, adapted for this purpose.

The invention claimed is:

1. An injection molding system for chocolate, the injection molding system comprising:
    an injector fastened to a chamber for the chocolate, the injector comprising an injection channel, wherein the injector extends through a heating plate positioned beneath the chamber and a cooling plate positioned beneath the heating plate, wherein a transit area is defined between the heating plate and the cooling plate;
    at least one heating element at least partially disposed inside of the injector adjacent to the injection channel;
    a convex die connected to a lower surface of the cooling plate, the convex die configured to pair with a concave die that receives the chocolate from the injector, the injector being at least partially disposed in a central hole defined by the cooling plate and in a cavity defined by the convex die, wherein an insulation space is at least partially defined between the convex die and the injector;
    a baffle at least partially disposed in the central hole of the cooling plate and positioned between the injector and the cooling plate, wherein the baffle extends into the insulation space between the injector and the convex die; and
    a gas insulating system comprising an inlet and an outlet, the inlet defined between a first side of the baffle and the injector, and the outlet defined between a second side of the baffle and the cooling plate, the inlet in fluid communication with the insulation space, the insulation space in fluid communication with the outlet, the outlet in fluid communication with the transit area, and the transit area in fluid communication with a cooling hole that extends through the cooling plate to the concave die,
    wherein an insulating gas received via the inlet is conveyed along the insulation space to the outlet to cool the convex die, and the insulating gas received by the transit area from the outlet flows through the cooling hole and onto the concave die to cool the concave die.

2. The injection molding system of claim 1, wherein the convex die comprises an internal surface, wherein the internal surface defines the cavity of the convex die to receive the injector, wherein a thermal insulator is disposed between the internal surface and the injector.

3. The injection molding system of claim 2, wherein the thermal insulator is fastened to the internal surface of the convex die.

4. The injection molding system of claim 1, wherein the convex die is configured to cooperate with the concave die and define a volume configured to shape chocolate received from the injector.

5. The injection molding system of claim 1, wherein the injection channel comprises an upper end and a lower end opposite the upper end, wherein the upper end is linearly coupled with a passage defined by a conductor of the chamber, wherein the conductor is configured to receive heat from the heating plate and heat the chocolate, which passes through the passage to the injection channel.

6. The injection molding system of claim 5, wherein the injector comprises a first seal positioned between the injector and the conductor, the first seal configured to prevent the chocolate flowing from the chamber to the injection channel from leaking.

7. The injection molding system of claim 6, wherein the first seal comprises a gasket.

8. The injection molding system of claim 1, wherein the cooling plate comprises a plurality of through-holes arranged substantially parallel with the injector.

9. The injection molding system of claim 1, wherein a seal is disposed between a portion of the heating plate and a portion of the cooling plate.

10. The injection molding system of claim 9, wherein the seal comprises a gasket.

11. The injection molding system of claim 1, wherein the heating plate comprises a flange.

12. The injection molding system of claim 1, wherein the cooling plate comprises a flange.

* * * * *